Figure 2:
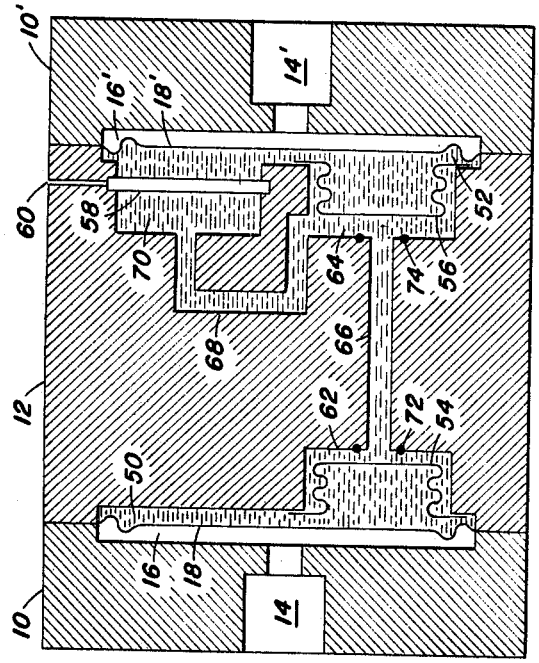

Sept. 10, 1968

W. F. O'CONNOR 3,400,588

FLUID PRESSURE GAUGE

Filed May 27, 1965

2 Sheets-Sheet 1

INVENTOR
Ward F. O'Connor
BY Flynn, Marn
& Jangarathis
ATTORNEYS

Sept. 10, 1968

W. F. O'CONNOR 3,400,588

FLUID PRESSURE GAUGE

Filed May 27, 1965

2 Sheets-Sheet 2

INVENTOR
Ward F. O'Conner
BY Flynn, Marn
& Jangarathis
ATTORNEYS

3,400,588
FLUID PRESSURE GAUGE
Ward F. O'Connor, Denville, N.J., assignor to The Lummus Company, New York, N.Y., a corporation of Delaware
Filed May 27, 1965, Ser. No. 459,281
6 Claims. (Cl. 73—407)

This invention relates generally to pressure measuring instruments and, more particularly, to an improved device for measuring the differential pressure between two fluids. The invention is characterized by novel means of protecting the measuring or sensing element from damage caused by excessive pressure.

Pressure measuring instruments in general are often subjected to pressures in excess of what they were designed to measure, and this can result in damage to various parts of the instrument, rendering the instrument either inaccurate or completely unworkable. Most devices for providing protection against overpressuring presently on the market have the sensing element operate the protection device. This makes manufacture more complicated and often introduces errors in measurement. It is thus desirable to have an overpressure protection system which functions independent of the sensing element.

A simple device of this type for preventing such overpressing is described in U.S. Patent No. 2,058,858. In this device, a collapsible hollow metal bellows is responsive to the pressurized fluid and a rod attached to the bellows closes a valve at a predetermined maximum pressure, thus preventing fluid at higher pressures from damaging the bellows or other portions of the instrument.

While devices of the type described above are satisfactory for preventing overpressuring above a given absolute pressure, there is need for a device which can prevent overpressuring a differential pressure sensing unit, where the differential pressure, rather than an absolute pressure, is what must be limited. In other words, such a device must limit the difference between two pressures, regardless of the absolute value of either pressure. The present invention is such a device.

It is thus an object of the present invention to provide a differential pressure indicator in which provision is made for preventing overpressuring.

A further object of the present invention is to provide simple and automatic overrange protection for a differential pressure instrument which is independent of the sensing element.

Still another object of the invention is to provide a differential pressure sensing device protected against overpressuring and which is economical to manufacture and simple to use.

Various other objects and advantages of the invention will become clear from the following description of several embodiments of the invention, and the novel features will be particuarly pointed out in connection with the appended claims.

In essence, the present invention provides a hydraulic system with displacement diaphragms responsive to the pressures ($P_1$ and $P_2$) of the two fluids, the hydraulic system activating displacement bellows which seal the system if the differential pressure exceeds a predetermined maximum. The sensing element, commonly an electrical resistance strain gauge, is subjected to a force proportional to $P_1$ on one side and a force proportional to $P_1$ plus or minus the differential pressure ($\Delta P$) on the other side, so that the net deflection of the element is proportional to $\Delta P$. The seal must be operable in two directions, inasmuch as the differential pressure goes up it may be because of changes in either $P_1$ or $P_2$.

While the invention will be described with reference to the use of resistance strain gauges as the sensing element, it is to be understood that the invention is not limited thereto, and that, for example, variable capacitance, variable reluctance or other devices may be employed. In all instances, connection of the sensing element is entirely conventional.

Understanding of the invention will be facilitated by reference to the accompanying drawings, wherein FIGURES 1, 2, 3 and 4 are each cross-sectional elevation views of a particular embodiment of the invention.

In all three of the embodiments illustrated there are certain features which are the same or similar, although this is of course not essential. In particular, the device of the invention is seen to be comprised of two identical end pieces 10, 10' covering a central section indicated generally at 12. The end pieces 10, 10' are the same in each embodiment of the invention, and have openings 14, 14' adapted to be connected to the two sources of pressure $P_1$ and $P_2$ which are to be compared. Connection may be by any convenient means, such as a pipe fitting. The pressurized fluid passes from opening 14 and into a shallow chamber 16 which is covered on the side opposite opening 14 by a diaphragm 18. As illustrated in the drawings diaphragms 18, 18' are locked between end pieces 10, 10' and opposing sides of central section 12. Of course, any suitable method of mounting or fastening diaphragms 18, 18' may be employed.

In operation, fluid passing into chamber 16 will exert a pressure $P_1$ on diaphragm 18, and fluid passing into chamber 16' will exert a pressure $P_2$ on diaphragm 18'. Diaphragms 18, 18' will be deflected by the fluids in proportion to the respective magnitudes of $P_1$ and $P_2$ and internal liquid seal displacement.

Figure 3:
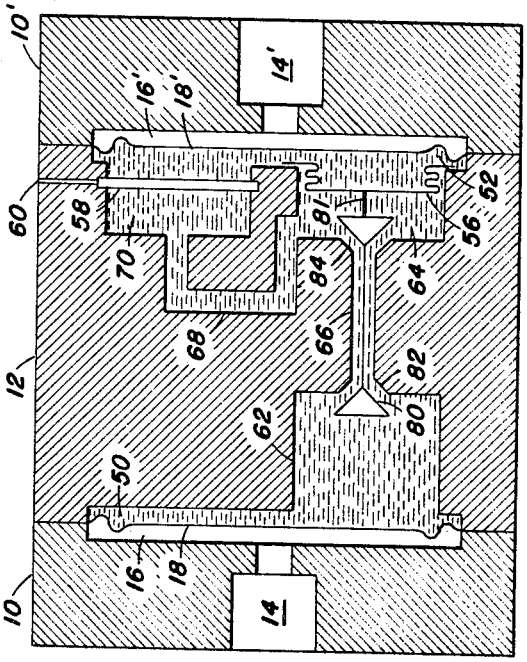
Figure 1:
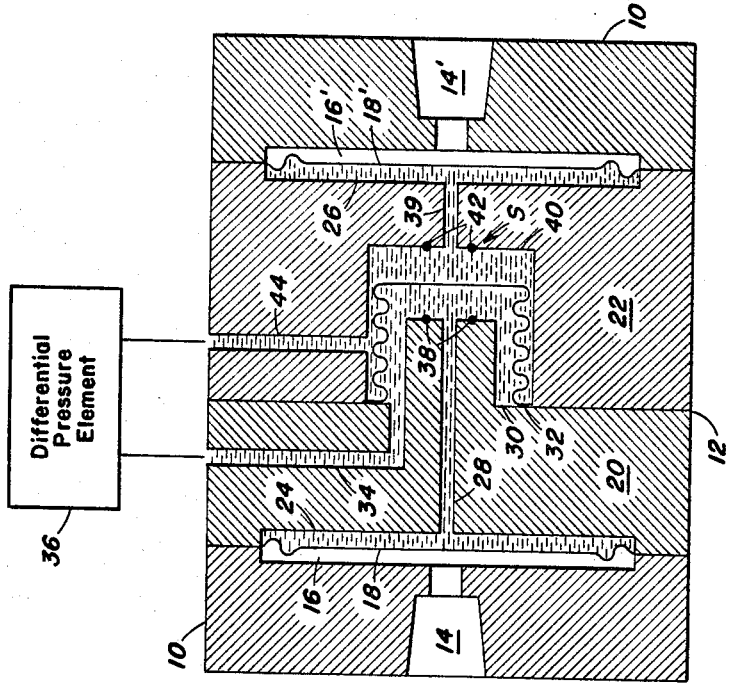

The foregoing features of the invention are common to each of the embodimnts of FIGURES 1–3, but attention is now directed to FIGURE 1, in which embodiment a single bellows acts against two openings to provide overrange protection for a sensing element.

As illustrated in FIGURE 1, central section 12 is comprised of two pieces 20 and 22 which fit tightly together. Each of pieces 20 and 22 also has a fluid-filled chamber, indicated at 24 and 26, which opposes chambers 16 and 16' across diaphragms 18 and 18'. Fluid from chamber 24 also fills passage 28 which passes through piece 20, terminating in another chamber 30, which has as its outer closing member a bellows 32. A secon passage 34 leads from chamber 30 to one side of the differential pressure sensing element (i.e., strain gauge) located exteriorly of the device and indicated at 36. Piece 20 is also provided with a seal ring 38 which surrounds the opening of passage 28 into chamber 30, the purpose of which will be discussed hereinbelow. As is clear from the drawing, chambers 24 and 30, and passages 28 and 34 are adapted to be filled with any non-compressible fluid; a non-corrosive, high boiling liquid being preferred.

As noted above, piece 22 has a chamber 26 opposed to chamber 16' across diaphragm 18'. Chamber 26 is in fluid communication with a passage 39 leading into chamber 40. The opening of passage 39 into chamber 40 is surrounded by a second seal ring 42. The chamber 40 passes the remainder of the way through piece 22 and is closed by bellows 32 and a portion of the back face of piece 20. A passage 44 leads out of chamber 40 and communicates with the other side of the differential pressure sensing element 36.

In operation, chambers 24 and 30, and passages 28 and 34, all in fluid communication, are filled with a suitable liquid. Similarly, chambers 26 and 40, and passages 39 and 44 are liquid filled. Of course, the two liquid systems are separated by bellows 32 and there is no communication between them. In this connection, it should be pointed out that differential sensing element 36 may be nothing more than two chambers separated by a diaphragm on which is mounted the electrical resistance strain gauge. Element 36 may be either interior or exterior to the assembly; it is mounted inside the assembly in the embodiments of FIGURES 2 and 3 discussed hereinbelow.

Under normal operation, i.e. when the differential pressure $\Delta P$ is within the preset maximum $\Delta P$ beyond which deflection of the strain gage is to be avoided, fluid pressure $P_1$ on diaphragm 18 forces liquid from chamber 24 through passage 28, into chamber 30 and passage 34. Bellows 32 is expanded a certain amount thereby and a pressure proportional to $P_1$ is exerted on the left leg of the sensing element. At the same time, fluid pressure $P_2$ on diaphragm 18' forces liquid in chamber 26 through passage 39, into chamber 40 and passage 44. Bellows 32, however, exerts a counter-pressure in chamber 40, so that the pressure in passage 44 is $P_2$, but which equals $P_1+\Delta P$. Thus, the pressure on one side of the sensing element is $P_1$, the pressure on the other side is $P_1+\Delta P$, so the deflection of the sensing element is proportional to $\Delta P$.

The highest differential pressure which the assembly will measure ($\Delta P_{max}$) is determined by the distance between the two seal rings 38 and 42 (in the drawings, this is shown to be a disproportionally large distance for clarity of illustration). If pressure $P_2$ becomes greater than $P_1$ by more than $\Delta P_{max}$ then bellows 32 will be forced back against seal ring 38, thus closing passage 34 off from passage 28 and the left side of the system. Further increases in $P_2$ will not cause any more deflection of the sensing element, because the liquid in passage 34 is incompressible and will balance the forces on the sensing element. In the same manner, if $P_1$ exceeds $P_2$ by more than $\Delta P_{max}$, bellows 32 will be forced against seal ring 42, thus sealing the liquid in passage 44, so that further increases in $P_1$ can cause no further deflection of the sensing element.

It is important to emphasize that $\Delta P_{max}$ is entirely independent of the absolute values of $P_1$ and $P_2$; it is related only to the difference between the two.

In FIGURE 2 there is illustrated an embodiment of the invention wherein two displacement bellows elements each control a single opening. In this embodiment, central section 12 is a single piece, having chambers 50 and 52 opposed to chambers 16 and 16', respectively, across diaphragms 18, 18'. Chambers 50 is in direct communication with bellows 54, and chambers 52 is in direct communication with bellows 56. Chamber 52 is also in direct communication with diaphragm 58 on which is mounted a strain gauge (not shown). A passage 60 is provided for connection of the strain gauge leads to the bridge circuit. Bellows 54 and 56 are surrounded by interconnected chambers 62 and 64, respectively, interconnection being provided by passage 66. A second passage 68 connects chamber 64 with chamber 70, opposed to chamber 52 across diaphragm 58. Seal rings 72 and 74 are provided around the respective openings of passage 66 into chambers 62 and 64.

Operation of this embodiment is similar to the operation of the embodiment of FIGURE 1 described above. A first body of liquid is in chamber 50, a second body of liquid is in chamber 52, and a third body of liquid occupies chambers 62, 64 and 70, as well as passages 66 and 68. A fluid pressure $P_2$ deflects diaphragm 18', and forces liquid in chamber 52 against diaphragm 58 and expands bellows 56. A fluid pressure $P_1$ exerted against diaphragm 18 forces liquid in chamber 50 to expand bellows 54 The pressure exerted by the liquid in chamber 70 will in this instance be $P_1+\Delta P$, which is balanced by the pressure $P_2$ exerted by the opposing liquid in chamber 52, so deflection of diaphragm 58 between the two, and deflection of the strain gauge mounted thereon, is proportional to $\Delta P$. The value of $\Delta P_{max}$ is again determined by the travel of either of the bellows 54, 56 necessary to reach the respective seal rings 72, 74, the sealing of either being sufficient to prevent further deflection of diaphragm 58.

The embodiment of FIGURE 3 is similar to that of FIGURE 2, and identical parts have been given the same reference numerals. The differences between the two embodiments are that bellows 54 (FIGURE 2) has been removed, along with the seal rings, and a valve system 80 installed at either end of passage 66. Valve 80 is connected to bellows 56 by a wire 81 or the like so that it can be pulled or pushed. Rather than seal rings, appropriately faced seats 82, 84 are provided for the seating of valves 80. In operation, expansion of bellows 56 will force one valve to close, and contraction of bellows 56 will allow the other valve to close. This embodiment has the advantage of making $\Delta P_{max}$ easily changeable, in that the length of the connector between opposite ends of the valve system 80 controls this parameter. A further difference between this embodiment and that of FIGURE 2 is that only two bodies of liquid are involved, rather than three, one body fills chambers 50, 62, 64 and 70 and passages 66 and 68, and the other body fills only chamber 52. As is clear from the drawing, operation of the two embodiments is essentially identical.

Figure 4:
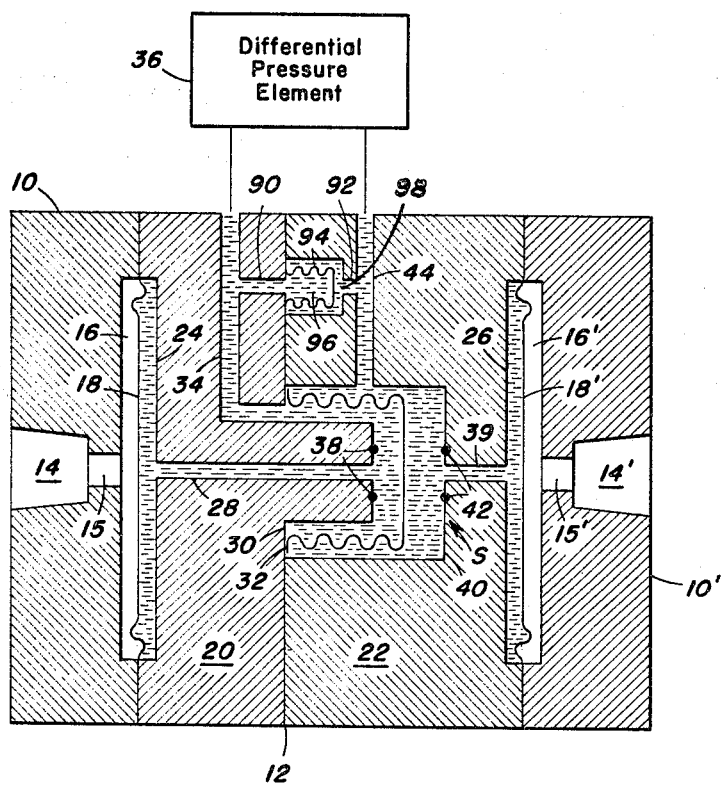

The embodiments illustrated in FIGURES 1–3 provide overrange protection for differential pressures ($\Delta P$) in excess of a predetermined maximum. There are instances, however, where the ambient temperatures to which the unit is subjected vary over such a broad range that the sensing element must also be protected against overpressure caused by thermal expansion of the sealed-in liquids. A device which provides such thermal expansion is illustrated in FIGURE 4, which in all other respects is similar to FIGURE 1. Those skilled in the art will recognize that the thermal protection of this embodiment may be applied to any of the other embodiments of the invention.

In FIGURE 4, passages 34 and 44 leading to the sensing element 36 are interconnected by passages 90 and 92 across a small bellows or diaphragm 94, in much the same manner as bellows 32 separates liquid in passages 28 and 38. Passage 90 opens into chamber 96 on one side of bellows 94 and passage 92 opens into chamber 98 on the opposing side thereof. As can be seen from the drawing, bellows 94 is effectively connected in parallel with sensing element 36. Bellows 94 compensates for the thermally caused volume changes of the liquid on the sealed-in side of the pressure element by transmission thereof to the other fluid, and thus provides protection for the sensing element. Thus, the volume of liquid on the sealed-in side during an overload state; i.e., when the bellows 32 closes a pressure port, may change because of temperature changes and the bellows 94 is free to move to compensate for the volume changes. In the absence of bellows 94, such volume changes would have to be compensated for entirely by the differential pressure sensing element 36 and, therefore, bellows 94 functions as a thermal protection device during an overload state. It does this without affecting the accuracy of $\Delta P$ measurements under normal conditions since movement of the bellows 94 in a non-overload state does not affect the pressures in passages 34 and 44.

It will be understood that various changes in the details, materials, steps and arrangements of parts, which have been herein described and illustrated in order to explain the nature of the invention, may be made by those skilled in the art within the principle and scope of the invention as expressed in the appended claims.

What is claimed is:

1. Device for measuring differential pressures that comprises:
   (a) first diaphragm means responsive to a first pressure;
   (b) first confined, non-compressible fluid means adjacent said first diaphragm means and responsive thereto;

(c) first bellows means responsive to said first fluid means;

(d) second diaphragm means responsive to a second pressure;

(e) second confined, non-compressible fluid means adjacent said second diaphragm means and responsive thereto, said second fluid means also being responsive to said bellows means;

(f) sensing means responsive to said first and second fluid means, said first fluid exerting a pressure proportional to said first pressure and said second fluid exerting a pressure proportional to said first pressure and the difference between said first and second pressures;

(g) closure means cooperating with said bellows means and operable to seal one of said fluid means when the difference between said first pressure and said second pressure exceeds a predetermined maximum; and (h) thermal protection means, said means comprising second bellows means having said first fluid on one side thereof and said second fluid on the other side thereof, said second bellows being effectively in parallel with said sensing means, whereby said second bellows means compensates for temperature variations when the closure means seals one of said fluid means.

2. The device as claimed in claim 1, wherein said sensing means comprise a third diaphragm having said first fluid acting on one side thereof and said second fluid acting on the other side thereof, said third diaphragm having a sensing element attached thereto and capable of generating a signal proportional to the deflection thereof.

3. The device as claimed in claim 1, wherein said closure means comprise first and second seal rings, said rings defining the limits of travel of said bellows means and, when contacted by said bellows, sealing said first and second fluids, respectively, between said ring and said sensing means.

4. The device as claimed in claim 1, wherein said closure means comprise a pair of valves responsive to said bellows means, said bellows acting to close one valve at one limit of travel and close the other valve at the other limit of travel, closure of either of said valves sealing off fluid communication between said second diaphragm means and said sensing means.

5. Device for measuring differential pressures that comprises:

first diaphragm means responsive to a first pressure;
first confined, non-compressible fluid means adjacent said first diaphragm means and responsive thereto;
first expandable bellows means responsive to said first fluid;
second diaphragm means responsive to a second pressure;
second confined non-compressible fluid means adjacent said second diaphragm means and responsive thereto;
second expandable bellows means responsive to said second fluid;
third confined, non-compressible fluid means responsive to said first and second bellows means;
third diaphragm means having said first fluid on one side thereof and said third fluid on the other side thereof, deflection of said third diaphragm being proportional to the difference between said first and second pressures;
deflection sensing means on said third diaphragm means; and
closure means cooperating with said bellows means and operable to seal said third fluid means between said closure and said third diaphragm when the difference between said first and second pressures exceeds a predetermined maximum.

6. The device as claimed in claim 5, wherein said closure means comprise first and second seals pressed upon by said first and second bellows, respectively, pressing by either of said bellows upon said seal acting to seal said third fluid between said seal and said sensing means.

References Cited

UNITED STATES PATENTS 2,977,991 4/1961 Baner _____ 73—407 XR
3,058,350 10/1962 Brown _____ 73—407
3,158,000 11/1964 Aldinger _____ 73—407 XR
3,274,833 9/1966 Ollivier et al. _____ 73—407

DAVID SCHONBERG, *Primary Examiner.*

D. O. WOODIEL, *Assistant Examiner.*